J. T. McDOUGALL.
Furnace.
No. 60,219.
2 Sheets—Sheet 1.
Patented Dec. 4, 1866.
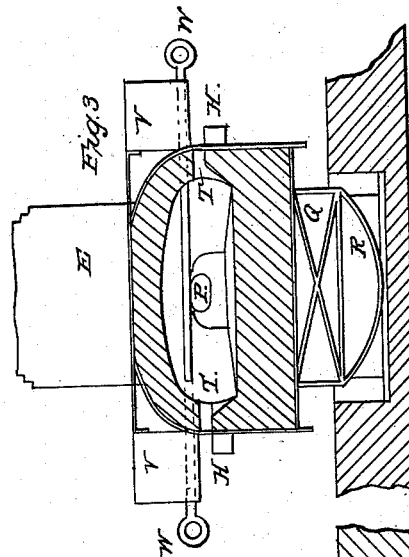
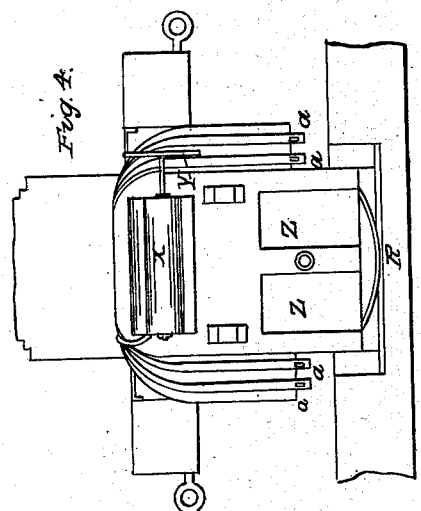
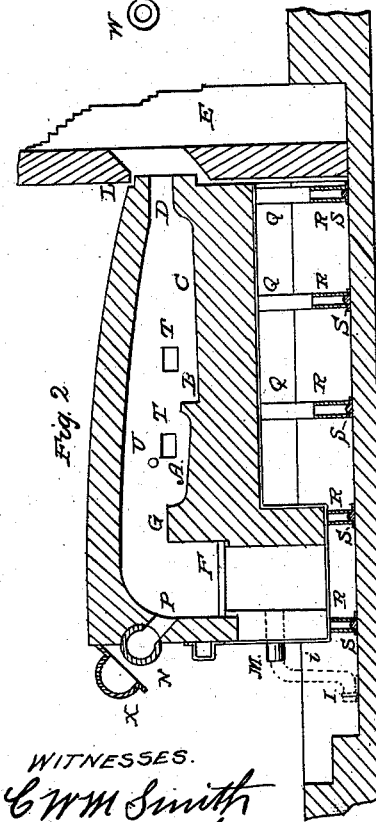
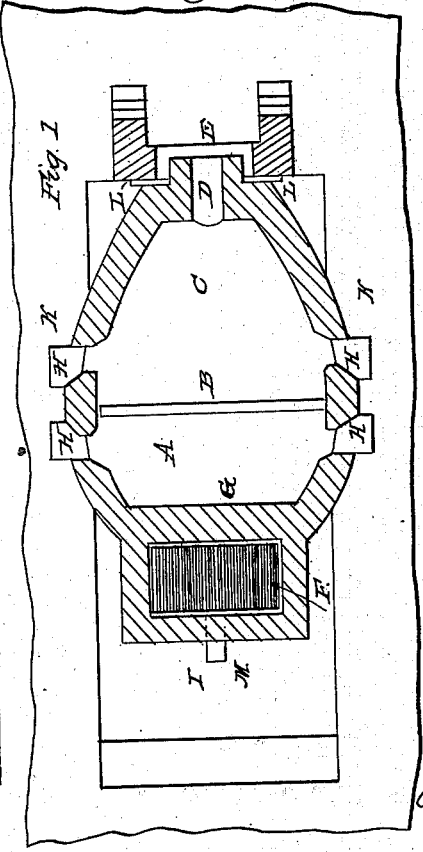
WITNESSES.
C W M Smith
Gus A Mauthey
INVENTOR
Jno T McDougall J. T. McDOUGALL.
Furnace.
No. 60,219.
2 Sheets—Sheet 2.
Patented Dec. 4, 1866.
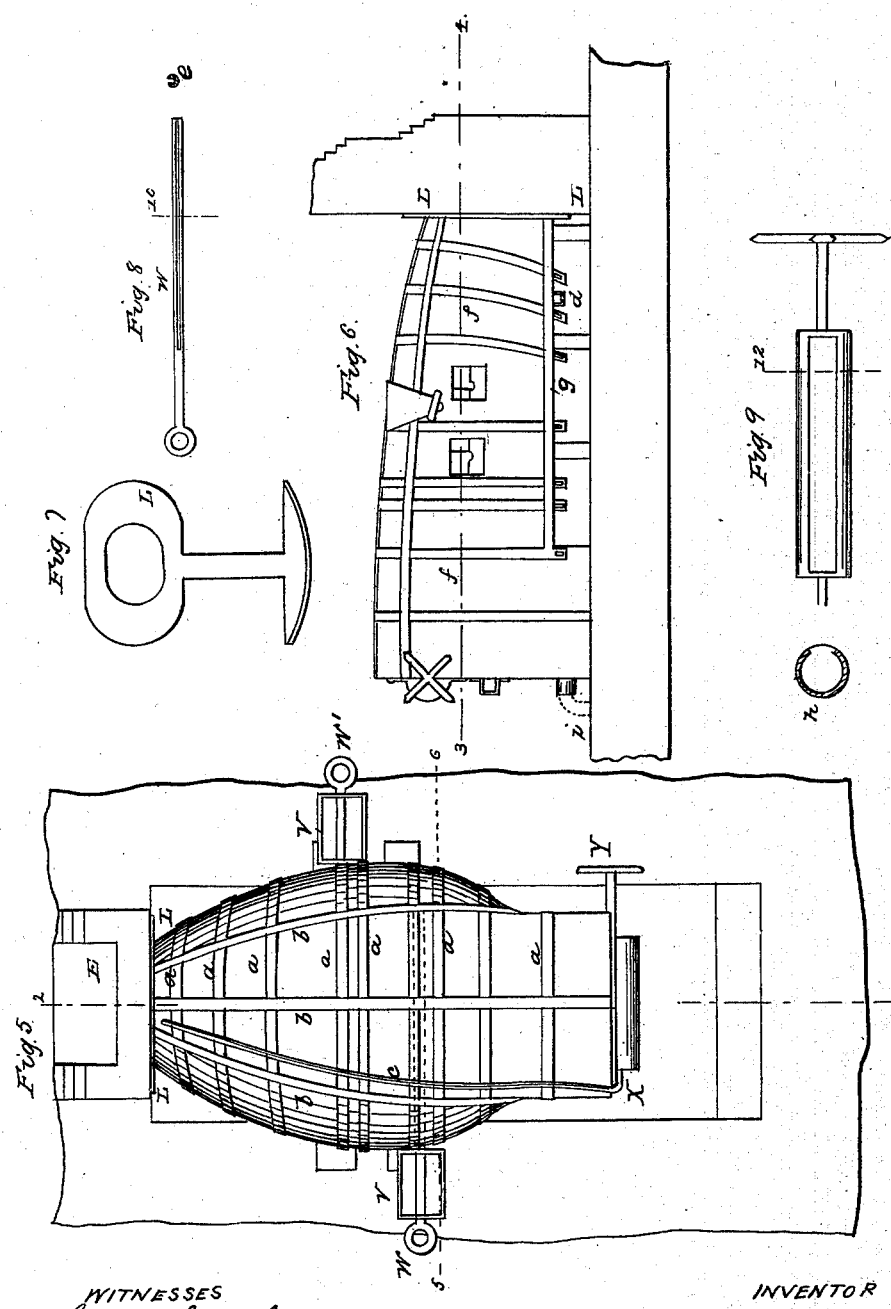

United States Patent Office.

IMPROVED FURNACE.

JAMES T. McDOUGALL, OF SAN FRANCISCO, CALIFORNIA.

Letters Patent No. 60,219, dated December 4, 1866.

SPECIFICATION.

TO ALL WHOM IT MAY CONCERN:

Be it known that I, JAMES T. McDOUGALL, of the city and county of San Francisco, State of California, have invented certain new and useful Improvements in "Reverberatory Furnaces" for the reduction of ores and refining of metals; and I do hereby declare that the following description and accompanying drawings are sufficient to enable any person skilled in the art or science to which it most nearly appertains to make and use my said invention without further invention or experiment.

The nature of my said invention consists of the following-described improvements, that is to say, my furnace is constructed so that it rests on rockers, and by the use of levers can be made to move from side to side by a tipping or cradle movement, as desired. By this arrangement the metallurgist is enabled to change the melted metals or minerals from one point or side of the hearth to the other, thereby agitating the contents, and bringing the material to be operated upon into immediate contact with the reducing and refining agents. It also greatly facilitates the removal of the slag and metal from the furnace, and in a great degree dispenses with the use of rabbling irons, which are very expensive, because of the rapid decomposition that they undergo when immersed in a liquid sulphuretted metal, and the counteracting effects of the material that they add to the metallic bath. My invention also relates to a new arrangement for the smelting and refining hearths, combining the two in one, with an elevation or dam-wall between; also, to a new device for feeding the fuel, ores, and fluxes to the furnace, the fuel having first been deprived of its moisture, and the external air excluded during the process of feeding. Lastly, my invention relates to a new arrangement for securing the furnace from the injurious effects produced by expansion and contraction.

Referring to the drawings—

Figure 1 is a top view of my furnace, with the portion above the line of the hearth removed, taken in the line 3, 4, fig. 6.

Figure 2, a side section, taken in the line 1, 2, fig. 5.

Figure 3, a cross-section, taken in the line 5, 6, fig. 5.

Figure 4, an end view.

Figure 5, a top view or plan.

Figure 6, an elevation.

Figure 7, a chimney piece or shield.

Figure 8, feeding rod for ores and fluxes.

Figure 9 shows device for feeding fuel to furnace.

I construct my furnace of fire-brick, or other suitable refractory material, with an outer shell or cover of iron, enclosing both ends and all of that portion below the line of the doors, conforming in shape to the interior arrangement, having a continuous hearth A C, with division B. A is the smelting hearth, beginning at the bridge-wall G, having a gradual inclination in the direction of the chimney E sufficient to allow the liquid portion of the mineral under treatment to flow freely in that direction, near its junction with that portion C called the refining hearth, where it again rises, forming a ridge or dam-wall B, extending from side to side across the hearth, and having a height about the same as the end next to the bridge-wall. The refining portion of the hearth C is in shape half oval, conforming in width to that portion called the dam-wall, and terminating abruptly against it where the two join, but having a somewhat lower level than any other portion of the refining hearth, and extending back from the dam-wall to the chimney flue D. The object of this arrangement is to give less depth to the metallic bath as the heat decreases in intensity; also to facilitate the drainage of metals toward the door hearth H H, where they are drawn off by a movement from side to side of the furnace. The doors T T are for the purpose of drawing off the slag and metals, as well as to watch the operation of smelting and refining, and may be stopped by any well-known method.

For supplying the fuel to my furnace I employ a cylinder N, figs. 2, 9, made of iron or other suitable material, having an opening longitudinally for about one-third of its circumference, with head-pieces. This cylinder is placed at a suitable distance above the fire-grate F, and is made to revolve in a segment of a circle, hollowed out at the front end of the brick lining of the furnace, so arranged that when it is turned over the contents will be emptied into the grate. Ordinarily the cylinder will be placed so that one-half of its diameter will be within the outer casing of the furnace, and over it a cover or case X, (shown in figs. 2, 4, 5,) conforming in shape, and hung upon hinges, so that it will fall over the cylinder, shutting closely. The contents of the cylinder are emptied into the grate through the chute P by means of the handle Y. In this manner the external air is prevented from reaching the cylinder in sufficient quantities to cause combustion, and as the contents are replenished immediately after being or having been discharged, the succeeding charge will be submitted to a considerable degree of heat during the interval between firing. A small pipe, c, (fig. 5,) leads from one end of the cylinder over the top of the furnace, which conducts the steam and vapor into the chimney near the neck of the furnace. By this arrangement the fuel will be deprived of its watery combination, rendering it suitable for ready combustion, and less liable to crack or splinter, in which case it falls unconsumed below the fire-grate and is wasted.

I conceive that the principle to be governed by for supplying the ore and fluxes to the smelting hearth must be just in proportion to the amount of caloric generated. Careful and repeated trials have fully demonstrated that during the perfect combustion of one pound of good bituminous coal sufficient caloric is evolved to raise the temperature of four pounds of material, requiring $2880°$ Fahrenheit for its fusion, from $32°$ Fahrenheit to its melting point, or, in other words, to melt cast iron. For example, supposing that a working furnace can be maintained at a steady temperature of $2900°$ Fahrenheit by a consumption of one hundred and fifty pounds of fuel per hour, and that the consumption be increased one hundred and fifty pounds per hour, making three hundred pounds, then the full reducing capacity will be just six hundred pounds of ore per hour. Now, if the furnace be fed just in proportion to the increase of the heat, then it follows, by an immutable law of equivalents, that the capacity for immediate reduction is equal to the increase of temperature, deducting, however, only the heat abstracted by the conduction and radiation of the feeding process. With these facts in view, and to accomplish the desired object, I employ a wedge-shaped hopper V, with feeding rod or bar W, fig. 8, usually to be attached to the side of my furnace, in such a position that the round bar running across the very bottom will enter the furnace about midway between the bridge-wall and dam-wall, about on a level with the top of the bridge-wall, of sufficient length to reach nearly across the smelting hearth. In this bar there is a groove or hollow, with a handle at one end, worked by hand or machinery. When the hopper, which contains the material is prepared for smelting, the man attending gives the bar a forward movement into the furnace, with the groove upward, filled with material; then, by a quick turn either to the right or left, the contents are deposited onto the smelting hearth as desired, the bar being quickly withdrawn, groove downward, and the same operation repeated as often as required. In a furnace reducing six hundred pounds per hour, and the bar carrying ten pounds per stroke, there will of course be required one stroke per minute. Now, as the stroke can easily be made in fifteen seconds, it follows that the bar can never attain a temperature of more than one-fourth of that of the furnace. From this temperature must be deducted the caloric lost by conduction and radiation. It is found by experimental tests that when the temperature of the furnace is sufficient to fuse cast iron, that one stroke per minute failed to keep lead in a constant state of fusion in the hollow of the bar. Repeated and long trials have fully demonstrated that this principle applied will of itself save fifty per cent. of fuel in smelting ores in a reverberatory furnace.

I also apply the above-described invention or apparatus for supplying fluxes to the refining hearth, (when required,) which is placed upon the opposite side of the furnace, marked W, fig. 5, entering the hearth. In the reduction of some ores my feed hopper may be placed immediately over the smelting hearth, and the revolving motion only given to the bar. In such an event the ore will be dropped through a chute onto the hearth.

I construct a movable shield L, figs. 6, 7, in order to accommodate the movement of the furnace to a stationary chimney, which rests on an independent segment of a circle of the same diameter as the rockers of the furnace, the head of the shield fitting the neck, and sufficiently large to cover the aperture in the chimney when the furnace is in movement.

An outer shell or case of iron is placed around the furnace, below the line of the working doors, conforming in shape to the interior, covering both ends excepting the necessary apertures for working. The object of this is to make the furnace very compact, dispensing with a vast amount of dead-wall and cumbersome material used in other methods of building reverberatory furnaces. It also keeps the bridge-wall and hearth, as well as the lower portions of the furnace, firmly in place; likewise prevents leakage, and affords a secure fastening to the frame upon which it rests; also a place to attach the longitudinal and cross-bars, preventing the injurious effects of expansion and contraction.

To secure my furnace I employ bands of iron $a\ a\ a$, &c., $b\ b\ b$, placed longitudinally and at right angles. $b\ b\ b$ are placed longitudinally, commencing near the line of the bridge-wall and passing down to the flue; $a\ a\ a$, &c., are placed at right angles, the whole conforming with the actual shape of the furnace, passing over the top under the longitudinal iron strap $g$, secured with keys driven under the lower edge of the iron shell or case, affording the facilities for firmly securing the fire material above the iron casing, and any other appliances of the furnace, as well as binding the whole closely together.

The furnace is placed upon rockers R R R, &c., having braces O O, &c., (fig. 2,) constructed of iron or other suitable material, having concave bearing surfaces, and resting on convex rails or bars S S, &c. By this arrangement it meets the longitudinal expansion, and either in expansion or contraction readjusting itself, and the bearing surfaces are always of the same dimension.

The movement of the furnace from right to left, or side to side, is effected by levers introduced into the sockets $d\ d$, underneath and at the front end, the former to be worked by a bent and the latter by a straight lever. The door hearths and supports are secured to the side of the furnace at sufficient distances below the working doors to sustain and keep in place the clay door hearths H H.

If found necessary a blast, instead of the draught of the chimney, may be used, by means of a hose or flexible joint, attached at N, fig. 1, to accommodate itself to the movement of the furnace.

Having thus described my improved "Reverberatory Furnace," what I claim, and desire to secure by Letters Patent, is—

1. I claim a smelting hearth of peculiar construction, A B, the sloping portion A inclining toward C, its lower portion forming the dam-wall or ridge B, running across the hearth of the furnace from side to side, substantially as described and for the purposes set forth.

2. I claim the half-oval-shaped refining hearth C, conforming in shape to the smelting hearth where they join, the sole of which has a slight inclination from the flue D toward B, where it has a lower level than the smelting hearth A, for the purposes specified and set forth.

3. I claim the manner of feeding the fluxes and ores to the furnace by the use of the hoppers V V and grooved bars or rods W W, substantially as described.

4. I claim the devices for feeding the fuel to the furnace, and depriving it of its moisture, by the use of the cylinder N and conducting pipe c, (or their equivalents,) as herein specified and shown.

5. The arrangement of the door hearths H H, for discharging the metal and slag, substantially as described.

6. The manner of binding the said furnace with bands of iron secured to the casing of the furnace and keyed below it, when arranged substantially as described and for the purpose set forth.

7. The concave rockers R R R, and convex rails S S S, with chimney shield L, and lever sockets $d\ d$.

Lastly, I claim the within-described improvements, whether employed singly or in combination, in smelting furnaces, substantially and for the purposes herein specified.

In witness whereof I have hereunto set my hand and seal this 27th day of February, A. D. 1866.

JAMES T. McDOUGALL. [L. S.]

Witnesses:
   C. W. M. SMITH,
   GUS. A. MANTHEY.